United States Patent
Zheng et al.

(10) Patent No.: US 12,508,579 B2
(45) Date of Patent: Dec. 30, 2025

(54) HUMIC ACID ASSISTED METAL NANOPARTICLE SYNTHESIS FOR THREE-WAY CATALYSIS APPLICATION

(71) Applicant: Johnson Matthey Public Limited Company, London (GB)

(72) Inventors: Qinghe Zheng, Wayne, PA (US); Jing Lu, Wayne, PA (US); Michael Howard, Wayne, PA (US)

(73) Assignee: JOHNSON MATTHEY PUBLIC LIMITED COMPANY, London (GB)

( * ) Notice: Subject to any disclaimer, the term of this patent is extended or adjusted under 35 U.S.C. 154(b) by 621 days.

(21) Appl. No.: 18/062,349

(22) Filed: Dec. 6, 2022

(65) Prior Publication Data

US 2023/0234040 A1 Jul. 27, 2023

Related U.S. Application Data

(60) Provisional application No. 63/287,611, filed on Dec. 9, 2021.

(51) Int. Cl.

| | | |
|---|---|---|
| *B01J 31/02* | (2006.01) | |
| *B01J 21/04* | (2006.01) | |
| *B01J 21/06* | (2006.01) | |
| *B01J 23/46* | (2006.01) | |
| *B01J 35/02* | (2006.01) | |
| *B01J 35/45* | (2024.01) | |
| *B01J 35/56* | (2024.01) | |
| *B01J 37/02* | (2006.01) | |
| *B01J 37/08* | (2006.01) | |

(52) U.S. Cl.
CPC ............ *B01J 31/0244* (2013.01); *B01J 21/04* (2013.01); *B01J 21/066* (2013.01); *B01J 23/464* (2013.01); *B01J 35/45* (2024.01); *B01J 35/56* (2024.01); *B01J 37/0203* (2013.01); *B01J 37/0213* (2013.01); *B01J 37/08* (2013.01)

(58) Field of Classification Search
CPC ........ B01J 31/0244; B01J 35/45; B01J 35/56; B01J 21/04; B01J 21/066; B01J 23/464; B01J 37/0203; B01J 37/0213; B01J 37/08
See application file for complete search history.

(56) References Cited

U.S. PATENT DOCUMENTS

| | | |
|---|---|---|
| 9,687,818 B2 | 6/2017 | Siani |
| 2012/0077669 A1 | 3/2012 | Müller-Stach |
| 2016/0175937 A1 | 6/2016 | Xia |
| 2019/0015781 A1* | 1/2019 | Wei ...................... B01J 37/0211 |
| 2020/0030775 A1 | 1/2020 | Kitamoto |

FOREIGN PATENT DOCUMENTS

| | | |
|---|---|---|
| WO | 2007105052 A2 | 9/2007 |
| WO | 2016123523 A1 | 8/2016 |
| WO | 2016123534 A1 | 8/2016 |
| WO | 2021108736 A1 | 6/2021 |

OTHER PUBLICATIONS

Dwivedi Amarendra Dhar et al: "Fate of engineered nanoparticles: Implications in the environment", Coordination Chemistry Reviews, Elsevier Science, Amsterdam, NL, vol. 287, Jan. 7, 2015 (Jan. 7, 2015), pp. 64-78.

Kuwahara, Y.; Kango, H.; Yamashita, H. Pd Nanoparticles and Aminopolymers Confined in Hollow Silica Spheres as Efficient and Reusable Heterogeneous Catalysts for Semihydrogenation of Alkynes. ACS Catal. 2019, 9 (3), 1993-2006. https://doi.org/10.1021/acscatal.8b04653.

Long, W.; Brunelli, N. A.; Didas, S. A.; Ping, E. W.; Jones, C. W. Aminopolymer-Silica Composite-Supported Pd Catalysts for Selective Hydrogenation of Alkynes. ACS Catal. 2013, 3 (8), 1700-1708. https://doi.org/10.1021/cs3007395.

* cited by examiner

*Primary Examiner* — Yong L Chu

(57) ABSTRACT

A method of manufacturing a catalyst article, the method comprising: providing a complex of a humic acid or derivative thereof, and a PGM; providing a support material; applying the complex to the support material to form a loaded support material; disposing the loaded support material on a substrate; and heating the loaded support material to form nanoparticles of the PGM on the support material.

21 Claims, 4 Drawing Sheets

HUMIC ACID ASSISTED METAL NANOPARTICLE SYNTHESIS FOR THREE-WAY CATALYSIS APPLICATION

FIELD OF THE INVENTION

The invention relates to a method of manufacturing a catalyst article, a catalyst article obtainable by the method, an emission treatment system and a method of treating an exhaust gas.

BACKGROUND OF THE INVENTION

A three-way catalyst (TWC) allows simultaneous conversions (~98%) of CO, HCs and $NO_x$ from gasoline engine exhaust to innocuous compounds at stoichiometric air-to-fuel ratio. Specifically, the oxidation of CO and HCs to $CO_2$ and steam ($H_2O$) is mainly catalyzed by Pd, while the reduction of $NO_x$ to $N_2$ is mainly catalyzed by Rh. Modern TWCs use supported platinum group metal (hereinafter "PGM") catalysts (Pd, Rh, Pt, etc.) deposited on a single, double or multilayer support, with the support material consisting of metal oxides with high specific surface area, primarily stabilized gamma alumina and ceria-containing oxygen storage materials. The supported catalyst is washcoated on a ceramic monolithic substrate.

Conventional preparation of a TWC washcoat slurry generally involves the use of a solution of an inorganic PGM precursor, e.g. nitrate, acetate, or chloride salt, to allow the PGM element to be deposited onto the oxide support via incipient wetness or wet impregnation. Promoter salts are also often added to the washcoat formulations for enhanced TWC performance. Once the monolithic substrate is washcoated with the as-prepared slurry, drying and calcination steps are followed to decompose the inorganic salts and to allow PGM and promoter elements to be fixed onto the support materials. It is known that the performance of supported metal catalysts depends on the structure and composition of the metal nanoparticles, and the nature of the support. Conventional TWCs prepared using the above method often provide only limited control over the structure of the catalytically active species (i.e. average PGM particle size and composition, location of the active components, and metal-support interactions). This is mainly due to metal migration and grain growth during high temperature calcination process.

With increasingly stringent environmental regulations, TWCs with higher emissions abatement efficiency are needed. On the other hand, with increasing PGM cost, there is an urgent need of reducing PGM loading without compromising TWC performance. A better control of the PGM particle size and metal-support interaction is essential in optimizing the TWC performance. Furthermore, a uniformed PGM particle size distribution may contribute to a reduction in the extent of metal sintering due to Ostwald Ripening, as often occurs during a fuel cutoff process, an engine strategy used for enhanced fuel economy.

The catalyst light-off is the minimum temperature necessary to initiate the catalytic reaction. In particular, the light-off temperature is the temperature at which conversion reaches 50%. There is a need for catalyst articles with reduced light-off temperatures.

US 2012/0077669 A1 describes a polymer-assisted synthesis of a supported metal catalyst for automotive applications. The polymers used in the examples include poly(vinylpyrrolidone), poly(acrylic acid), and poly(ethyleneimine). In the described synthesis procedures, the support (alumina powder) is first impregnated with a polymer-containing aqueous solution. The impregnated support is then separated from the above solution by filtration and drying steps. The dried impregnated support is further impregnated with a PGM precursor solution by incipient wetness impregnation. The as-described process involves multiple steps for the formation of as-claimed supported metal catalysts, which increases the cost and difficulty for commercial-scale production. US 2012/0077669 A1 indicates that a lean burn engine is preferably used, such as a diesel engine or a lean burn gasoline engine, for the application of the technology.

SUMMARY OF THE INVENTION

One aspect of the present disclosure is directed to a method of manufacturing a catalyst article, the method comprising: providing a complex of a humic acid or derivative thereof, and a PGM; providing a support material; applying the complex to the support material to form a loaded support material; disposing the loaded support material on a substrate; and heating the loaded support material to form nanoparticles of the PGM on the support material.

Another aspect of the present disclosure is directed to a catalyst article obtained by the method in the first aspect.

The invention also encompasses an exhaust system for internal combustion engines that comprises the catalyst article in the second aspect.

DETAILED DESCRIPTION OF THE INVENTION

Figure 1A:
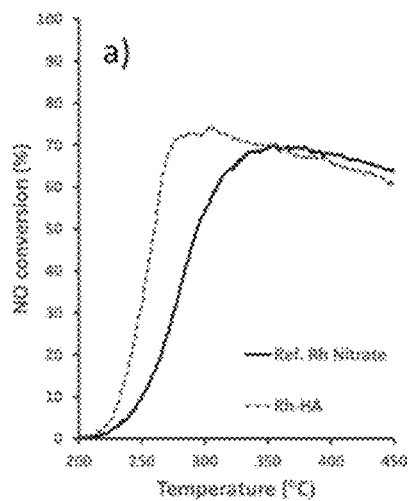
FIG. 1a shows NO conversion results of perturbated light-off performance testing at stoichiometric TWC condition of Reference Catalyst 1 and Catalyst 1.

The present invention seeks to tackle at least some of the problems associated with the prior art or at least to provide a commercially acceptable alternative solution thereto.

In a first aspect, the present invention provides a method of manufacturing a catalyst article, the method comprising:
  providing a complex of a humic acid or derivative thereof (preferably a humic acid), and a PGM;
  providing a support material;
  applying the complex to the support material to form a loaded support material;
  disposing the loaded support material on a substrate; and
  heating the loaded support material to form nanoparticles of the PGM on the support material.

Each aspect or embodiment as defined herein may be combined with any other aspect(s) or embodiment(s) unless clearly indicated to the contrary. In particular, any features indicated as being preferred or advantageous may be combined with any other feature indicated as being preferred or advantageous.

Surprisingly, when used in an emission treatment system, the catalyst article manufactured by the method of the present invention may exhibit favourable catalytic activity, in particular favourable three-way catalytic activity. For example, the catalyst article may exhibit favourable light-off performance, in particular conversions of NO, CO and total hydrocarbons, during three-way catalytic emissions abatement for a stoichiometric gasoline engine. Such favourable catalytic activity and light-off performance may be superior to that exhibited by conventional catalyst articles with the same/similar PGM specie(s), loading(s), support(s), and configuration(s). The catalyst article may be more durable in comparison to conventional catalyst articles. In other words, such favourable catalytic activity may be exhibited even after aging.

Advantageously, such superior performance may facilitate the use of lower loadings of PGMs in comparison to conventional catalyst articles without compromising catalytic performance. This may be beneficial in view of the high cost of such metals, in particular rhodium. Furthermore, such superior performance may facilitate the partial/complete substitution of high cost PGMs with lower cost PGMs or other transition metals without compromising catalytic performance.

Without being bound by theory, it is hypothesised that such superior performance may be provided by a favourable particle size distribution of the PGM nanoparticles on the support material. During PGM-humic acid complexation, ions of PGM may react with amine and/or carboxyl(ate) functional groups, with the same predictable amount of PGM ions "uptaken" by each humic acid structure, wherein the total amount of PGM "uptaken" is determined by the humic acid molecular structure/size and PGM-humic acid coordination ratio. Each complex may then react/interact with surface functional groups (e.g. hydroxyl groups) or surface charges on the support material to allow "anchoring" of PGM-humic acid complexes onto the support material surface. The "anchored" PGM-humic acid complexes may be separated apart due to steric effects and the available amount of support material surface functional groups/charges. The interaction between the complex and support material functional groups may increase PGM uptake by the support, compared to catalysts prepared by conventional methods. Without being bound by theory, it is also hypothesized that such even separation may lead to a narrower particle size distribution of PGM nanoparticles (more uniformed particle sizes) upon heating (calcination), which further leads to a reduction in excess agglomeration and/or sintering of PGM particles during ageing and/or fuel-cut events. In other words, compared to conventional catalyst, a more sintering-resistant catalyst article may be obtained by using the method of the present invention.

In comparison to the method of US 2012/0077669 A1, the method of the present invention is a simpler and more efficient "one-pot" method. The method of the present invention does not require separate impregnation, filtration, and drying steps for depositing the complex(es) onto the support material. By using the method of the present invention, the yield of complex-support and PGM-ligand interactions may increase because each humic acid structure added is utilized for interactions. In contrast, in US 2012/0077669 A1, only limited amount of polymers may stay on the support after the filtration and washing steps. Furthermore, the catalyst article prepared by the method of the present invention may be specifically used as a three-way catalyst for stoichiometric gasoline emissions abatement. In contrast, the catalyst article made by the method of US 2012/0077669 A1 has a particular application in lean burn diesel or gasoline engines.

The term "catalyst article" used herein may encompass an article in which a catalyst is supported thereon or therein. The article may take the form of, for example, a honeycomb monolith, or a filter, e.g. a wall flow filter or a flow-through filter. The catalyst article may be for use in an emission treatment system, in particular an emission treatment system for a gasoline engine, preferably a stoichiometric gasoline engine. The catalyst article may be for use in three-way catalysis.

Providing a complex of a humic acid or derivative thereof, and a PGM typically involves providing the complex in solution, for example an aqueous or alcohol solution. Providing a complex of a humic acid or derivative thereof, and a PGM typically involves mixing inorganic PGM precursor(s) and a humic acid or derivative thereof in pure or solution form in an aqueous medium, for example mixing PGM nitrate and humic acid, such as CAS number 1415-93-6, in water. The humic acid or derivative thereof may be in the form of a salt, such as an alkali metal salt.

Humic acid is known for its ability to strongly bond to heavy metal ions, and has been used in radiation technologies for removing heavy metals from waste water. However, this is a completely different field and application to its use in the present invention.

The term "humic acid" as used herein corresponds to the well-known term in the art. For example, humic acid may be described as the brown polymeric product from the decomposition of organic matter, particularly dead plants. This combination of polymers may contain aromatic and heterocyclic structures, carboxy groups, and nitrogen. The functional groups that contribute most to surface charge and reactivity of humic substances are phenolic and carboxylic groups. The molecules comprising the humic acid may form a supramolecular structure held together by non-covalent forces, for example. Humic acid as traditionally produced in a laboratory may not be a single acid; rather, it may be a complex mixture of many different acids containing carboxyl and phenolate groups so that the mixture behaves functionally as a dibasic acid or, occasionally, as a tribasic acid. The humic acid may also contain a fulvic acid component, for example.

Although the precise chemical structure of humic acid may not be well defined or well understood, because it may comprise a number of similar compounds of varying functionality, its definition is generally well understood. Humic acid is obtained from natural sources, and is therefore its use may be more environmentally friendly than methods involving the use of synthetic polymers. In some literature, humic acid may be referred to as ulmic acid.

Humic acid may be defined by the internationally recognized CAS number 1415-93-6. CAS numbers 68514-28-3 and 68131-04-4 are also known potassium and sodium salts of humic acid, respectively. The CAS number (or CAS Registry Number) is a unique numeric identifier to a specific substance. The identifying number is assigned by the Chemical Abstract Service (CAS) and the registry is maintained by CAS.

The humic acid may be supplied as a potassium salt, which may have a typical composition of, for example:
Potassium oxide ($K_2O$), 12% w/w on natural sample;
Total humic extracts, >85 or >75% w/w on dry sample;
Humic acid, 82 or 72% w/w on dry sample;
Fulvic acid, >3 or 3% w/w on dry sample;
Organic nitrogen (N), 1% w/w on natural sample;
Ash content, 31% w/w on natural sample;
Dry matter, >85% w/w;
Total carbon, 36% w/w.

Such a composition may have a pH of 8.45+/−1 (in 1% solution) or 8.95+/−1 (in 10% solution) and a solubility of 250 g/L.

The humic acid may also be supplied as a mixture of potassium humate and fulvic acid, which may have a typical composition of, for example:
Potassium oxide ($K_2O$), 4+/−0.5% w/w or 4.4+/−0.6% w/v;
Total humic extracts, 15% w/w or 16.6% w/v;
Humic acid, 12% w/w or 13.3% w/v;
Fulvic acid, 3% w/w or 3.3% w/v;
Organic matter, 13.1% w/w or 14.4% w/v.

Such a composition may have a pH of >10.

An example of a typical humic acid may have the following structure, for example:

Preferably, providing a complex of a humic acid or derivative thereof, and a PGM comprises contacting a PGM with a mixture of a humic acid or derivate thereof and fulvic acid. In such a method, a further complex comprising fulvic acid and a PGM may be present. Preferably, providing a complex of a humic acid or derivative thereof, and a PGM comprises contacting a PGM with a substance defined by one or more of CAS numbers 1415-93-6, 68514-28-3 and 68131-04-4. In other words, the humic acid or derivative thereof may preferably comprise a substance defined by one or more of CAS numbers 1415-93-6, 68514-28-3 and 68131-04-4. Preferably, the humic acid or derivative thereof comprises the substance defined by CAS number 1415-93-6.

The term PGM as used herein encompasses one or more platinum group metals selected from ruthenium, rhodium, palladium, osmium, iridium, and platinum. Preferably, the PGM comprises one or more of palladium, rhodium and platinum, more preferably rhodium and/or platinum, even more preferably rhodium. Such metals may be particularly suitable for carrying out three-way catalysis. In addition, such metals are expensive meaning that it would be advantageous to be able to provide similar levels of catalytic activity for the same amount of metal. Furthermore, the use of such metals in the method of the present invention may result in particularly favourable perturbated light-off performance. The PGM may be in the form of an alloy The complex may have a humic acid to PGM atom mass ratio (i.e. mass of humic acid/mass of PGM atoms in the complex) of from 0.5 to 5, preferably from 0.8 to 4, more preferably from 0.9 to 3, even more preferably from 1 to 2, still more preferably from 1.3 to 1.8. When the PGM is rhodium the humic acid to PGM mass ratio is preferably about 1.68. When the PGM is platinum, the humic acid to PGM mass ratio is preferably about 1.4. Such mass ratios may achieve particularly desirable PGM nanoparticle distributions on the final catalyst article and thereby contribute to achieving the improved light-off and catalytic performance demonstrated by catalyst articles manufactured by the method of the present invention.

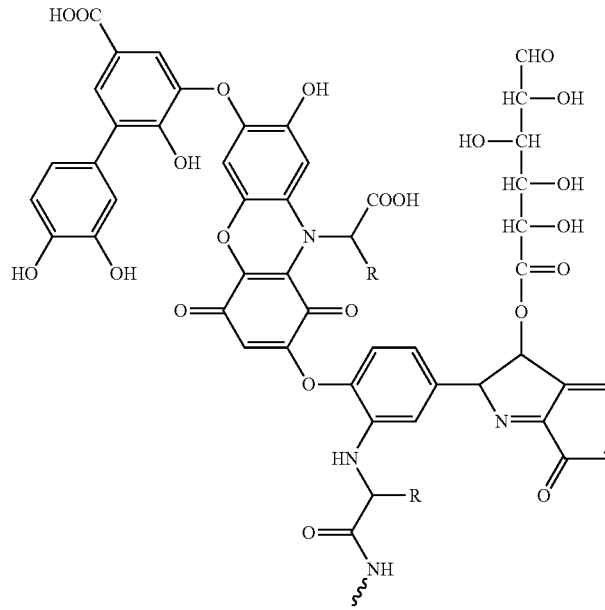
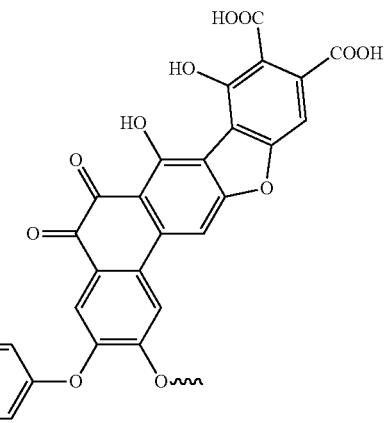

The support material may be any material that is capable of supporting the complex and nanoparticles thereon on therein. The support material may take any form, but is typically in the form of a powder, more typically a high surface area powder. When the method of the present invention is used to prepare a catalysed filter, such as a wall flow filter or flow-through filter, the support material will typically be in the form of a powder having a D50 of, for example, from 0.1 to 25 µm, more typically from 0.5 to 5 µm as measured using TEM. Such particle sizes may facilitate desirable rheological properties of a slurry used to coat the filter. The support material may function as a washcoat. The support material may be a washcoat or may be part of a washcoat.

The support material may also serve as an oxygen storage material, which stores and releases oxygen respectively at fuel lean and fuel rich conditions, for facilitating the three-way catalytic conversion.

Applying the complex to the support material typically involves contacting the complex and support material in the presence of a solvent (typically water) so as to produce a slurry. The term "slurry" as used herein may encompass a liquid comprising insoluble material, e.g. insoluble particles. The slurry may comprise (1) solvent; (2) soluble content, e.g. unreacted humic acid, inorganic PGM and promoter precursor(s), and PGM-humic acid complex (outside of the support); and (3) insoluble content, e.g. support particles with and without interactions with the humic acid and metal precursors. The slurry is typically stirred, more typically for at least 10 minutes, more typically for at least 30 minutes, even more typically for at least an hour. Increased contacting and/or stirring times may increase the amount of complex that is loaded onto the support material.

The term "loaded support material" as used herein may encompass a support material that has the PGM-humic acid complex loaded thereon (e.g. on the surface of a high-surface area metal oxide support material) and/or loaded therein (e.g. within the pores of a zeolite support material). The complex is typically fixed to the support, for example by electrostatic forces, hydrogen bonds, coordinate bonds, covalent bonds, and/or ionic bonds. For example, in the case of an oxide, amine and/or carboxyl(ate) functional groups in the humic acid and surface hydroxyl groups on the support may interact through electrostatic forces or hydrogen-bond formation.

The term "substrate" as used herein may encompass, for example, a ceramic or metallic honeycomb, or a filter block, e.g. a wall flow filter or flow-through filter. The substrate may comprise a ceramic monolithic substrate. The substrate may vary in its material composition, size and configuration, cell shape and density, and wall thickness. Suitable substrates are known in the art.

Disposing the loaded support material on a substrate may be carried out using techniques known in the art. Typically, the loaded support material is disposed on the substrate by pouring a slurry of the loaded support material into the inlet of the substrate using a specific moulding tool in a predetermined amount. As discussed in more detail below, subsequent vacuum, air knife and drying steps may be employed during the disposition step. When the support is a filter block, the loaded support material may be disposed on the filter walls, within the filter walls (if porous) or both.

Heating the loaded support material is typically carried out in an oven or furnace, more typically a belt or static oven or furnace, typically in hot air at a specific flow from one direction. The heating may comprise calcination. The heating may also comprise drying. The drying and calcination steps may be continuous or sequential. For example, a separate washcoat may be applied after the substrate is already washcoated and dried with a previous washcoat. A washcoated substrate can also be dried and calcined using one continuous heating program if coating is completed. During the heating, the complex may at least partially, substantially or completely decompose. In other words, the ligands of the complex, i.e. the humic acid or derivatives thereof, are at least partially, substantially or completely removed or separated from the PGM, and are removed from the final catalyst article. Particles of such separated PGMs may then begin to form metal-metal and metal-oxide bonds. As a result of the heating (calcination), the substrate is typically substantially free of humic acid or derivatives thereof, more typically completely free of humic acid or derivatives thereof.

The term "nanoparticle" as used herein may encompass a particle having a diameter of from 0.01 nm to 100 nm as measured by TEM. The nanoparticles may be in any shape, e.g. a sphere, a plate, cubic, cylindrical, hexagonal or a rod, but are typically spherical. The largest dimension of the nanoparticle (i.e. the diameter if the nanoparticle is spherical), will typically be from 0.5 to 10 nm, more typically from 1 to 5 nm, as measured by TEM.

Following the heating step, the substrate is typically cooled, more typically to room temperature. The cooling is typically carried out in air with or without cooling agent/media, typically without cooling agent.

The PGM preferably comprises, consists essentially of or consists of one or more of palladium, rhodium and platinum, more preferably comprises, consists essentially of or consists of rhodium and/or platinum, even more preferably comprises, consists essentially of or consists of rhodium. Rhodium is a particularly expensive PGM and forms particularly suitable complexes with humic acid or derivatives thereof. Platinum is a particularly expensive PGM and forms particularly suitable complexes with humic acid or derivatives thereof.

In a preferred embodiment, the PGM comprises, consists essentially of or consists of rhodium and platinum. The use of such metals in the method of the present invention may result in particularly favourable perturbated light-off performance.

Preferably, the humic acid or derivate thereof further comprises fulvic acid. In some cases it is common to obtain humic acid in such a mixture. Fulvic acid may form further complexes with the PGM, for example, and contribute to achieving the advantageous distribution properties of the final catalyst article.

Preferably, providing a complex of a humic acid or derivative thereof, and a PGM comprises contacting a PGM with a substance defined by one or more of CAS numbers 1415-93-6, 68514-28-3 and 68131-04-4, more preferably CAS number 1415-93-6. These particular compositions may work particularly well in the method of the present invention.

The support material preferably comprises an oxide, preferably one or more of $Al_2O_3$ (aluminum oxide or alumina), $SiO_2$, $TiO_2$, $CeO_2$, $ZrO_2$, $V_2O_5$, $La_2O_3$ and zeolites. The oxide is preferably a metal oxide. The support material more preferably comprises alumina, even more preferably gamma-alumina. The support material preferably comprises ceria-zirconia. The support material preferably comprises alumina and ceria-zirconia. The alumina and/or ceria-zirconia is preferably doped, more preferably with an oxide of one or more of lanthanum, neodymium, yttrium, niobium, praseodymium, hafnium, molybdenum, titanium, vanadium, zinc, cadmium, manganese, iron, copper, calcium, barium, strontium, caesium, magnesium, potassium, or sodium; even more preferably with an oxide of lanthanum, neodymium or yttrium. Such doped oxides are particularly effective as support materials. Preferably, the dopant is present in the alumina and/or ceria-zirconia in an amount of from 0.001 wt. % to 20 wt. %, and more preferably from 0.5 wt. % to 10 wt. %.

The support material is preferably in the form of a powder having a D90 of from 0.1 to 25 µm, more preferably from 0.5 to 5 µm.

The loaded support material is preferably disposed onto the substrate in the form of a slurry. A slurry is particularly effective at disposing a material onto a substrate, in particular for maximized gas diffusion and minimized pressure drop during catalytic conversion.

Providing a complex of a humic acid or derivative thereof, and a PGM preferably comprises synthesising the complex in situ in the slurry.

The slurry is preferably prepared by a method comprising:
contacting a PGM salt and a humic acid or derivative thereof in water to form the complex of a humic acid or derivative thereof, and a PGM in an aqueous solution;
applying the complex to the support material to form a loaded support material by contacting the support material with the aqueous solution;
optionally adding one or more of an oxygen storage material, preferably ceria-zirconia; a promoter salt; a binder; an acid or a base; a thickening agent; and a reducing agent to the aqueous solution.

Such a "one-pot" preparation method may be simplified and lower cost in comparison to conventional methods. It may also maximize utilization of the polymers/humic acid.

In other words, the steps of providing a complex of a humic acid or derivative thereof, and a PGM; providing a support material; applying the complex to the support material to form a loaded support material; and disposing the loaded support material on a substrate may comprise:
contacting a PGM salt and a humic acid or derivative thereof in water to form the complex of a humic acid or derivative thereof, and a PGM in an aqueous solution;
adding the support material to the aqueous solution to form a slurry of loaded support material;
optionally adding one or more of an oxygen storage material, preferably ceria-zirconia; a promoter salt; a binder; an acid or a base; a thickening agent; and a reducing agent to the slurry; and
disposing the slurry on the substrate.

In another preferred embodiment, the slurry is prepared by a method comprising:
contacting a PGM salt and a support material in water to form a support material suspension;
contacting the support material suspension with a humic acid or derivative thereof to form a loaded support material, the loaded support material comprising support material having a complex loaded thereon, the complex comprising a complex of a humic acid or derivative thereof, and the PGM;
optionally adding one or more of an oxygen storage material, preferably ceria-zirconia; a promoter salt; a binder; an acid or a base; a thickening agent; and a reducing agent to the support material suspension.

Such a "one-pot" preparation method may be simplified and lower cost in comparison to conventional methods. It may also maximize utilization of the polymers/humic acid.

The loading may comprise washcoating.

The slurry preferably has a solids content of from 10 to 40%, preferably from 15 to 35%. Such a solids content may enable slurry rheology suitable for disposing the loaded support material onto the substrate. For example, if the substrate is a honeycomb monolith, such solid contents may enable the deposition of a thin layer of washcoat onto the inner walls of the substrate. If the substrate is a wall flow filter, such solids contents may enable the slurry to enter the channels of the wall flow filter and may enable the slurry to enter the walls of the wall flow filter.

Preferably, the slurry further comprises one or more of:
an oxygen storage material, preferably ceria-zirconia;
a promoter salt;
a binder;
an acid or a base;
a thickening agent; and
a reducing agent.

Promotors may include, for example, a non-PGM transition metal element, a rare earth element, an alkali group element, and/or a combination of two or more of the above elements within the same or different groups in periodic table. The promotor salt may be a salt of such elements.

Binders may include, for example, an oxide material with small particle size to bind the individual insoluble particles together in washcoat slurry. The use of binders in washcoats is well known in the art.

Thickening agents may include, for example, a natural polymer with functional hydroxyl groups that interacts with insoluble particles in washcoat slurry. It serves the purpose of thickening washcoat slurry for the improvement of coating profile during washcoat coating onto substrate. It is usually burned off during washcoat calcination. Examples of specific thickening agents/rheology modifiers for washcoats include glactomanna gum, guar gum, xanthan gum, curdlan schizophyllan, scleroglucan, diutan gum, Whelan gum, hydroxymethyl cellulose, carboxymethyl cellulose, hydroxyethyl cellulose, methyl cellulose, methyl hydroxyethyl cellulose, methyl hydroxypropyl cellulose and ethyl hydroxycellulose.

The term "reducing agent" as described herein may encompass a compound that can reduce the PGM cations to particles in its metallic state in situ during washcoat preparation.

An organic acid can be added that acts as a reductant for PGM and/or creates a reducing environment during the later heating/calcinating step. Examples of a suitable organic acid may include citric acid, succinic acid, oxalic acid, ascorbic acid, acetic acid, formic acid, tannic acid, and combinations thereof.

In a preferred embodiment, the PGM comprises rhodium, the support material comprises alumina and the slurry further comprises ceria-zirconia. In another preferred embodiment, the PGM comprises rhodium, the support material comprises ceria-zirconia and the slurry further comprises alumina. In another preferred embodiment, the PGM comprises rhodium and the support material comprises alumina and ceria-zirconia.

The method preferably further comprises disposing a further slurry on the substrate, the further slurry comprising one or more of a further support material; an oxygen storage material; a promoter salt; a binder; an acid or a base; a thickening agent; and a reducing agent, wherein disposing the further slurry on the substrate takes place before disposing the support material on the substrate and/or after heating the loaded support material to form nanoparticles of the PGM on the support material. This may result in a catalyst article having multiple layers of different washcoats, for example a bottom washcoat containing, inter alia, rhodium nanoparticles supported on alumina, and a top washcoat containing, inter alia, rhodium nanoparticles supported on alumina. Further examples of such multiple layers are discussed in more detail below.

Disposing the loaded support material on a substrate preferably comprises contacting the slurry with the substrate (e.g. pouring the slurry into an inlet of the substrate) and optionally:
- applying a vacuum to the substrate, and/or
- drying the slurry on the substrate.

This may result in a favourable distribution of the loaded support material on the substrate.

The drying preferably occurs:
- at a temperature of from 60° C. to 200° C., more preferably from 70° C. to 130° C.; and/or
- for from 10 to 360 minutes, preferably from 15 to 60 minutes.

The substrate may be a "blank", i.e. un-washcoated, substrate. Alternatively, the substrate may have one or washcoats already loaded thereon. In such a situation, the final catalyst article may comprise multiple layers of different washcoats.

The substrate preferably comprises cordierite. Cordierite substrates are particularly suitable for use in catalyst articles.

The substrate is preferably in the form of a honeycomb monolith, a wall flow filter or a flow through filter.

The heating is preferably carried out:
- at a temperature of from 400° C. to 700° C., preferably from 400° C. to 600° C., more preferably from 450° C. to 600° C.; and/or
- for from 10 to 360 minutes, preferably from 35 to 120 minutes.

Lower temperatures and/or shorter heating times may result in insufficient decomposition of the complex and/or may result in high levels of humic acid or derivatives thereof remaining in the substrate. Higher temperatures and/or longer heating times may lead to the particles of PGM having an unfavourably large particle size, presumably due to sintering. Higher temperatures and longer heating times may also lead to damage to the catalyst article.

The heating preferably comprises calcining. The term "calcining" as used herein may encompass a thermal treatment process in the absence of, or limited supply of, air or oxygen to bring about a thermal decomposition. However, typically, calcining in the present context involves heating in air in an oven.

The nanoparticles preferably have a D50 of from 0.1 nm to 10 nm, more preferably from 0.2 to 5 nm, even more preferably from 0.2 to 4 nm. The D50 may be measured by TEM. Such particle sizes may result in a favourable level of catalytic activity.

In a further aspect, the present invention provides a catalyst article obtainable by the method described herein, the catalyst article for use in an emission treatment system.

In comparison to conventional catalyst article, the catalyst article obtainable by the method described herein may contain PGM particles having favourably small particle sizes and a favourable particle size distribution (e.g. a D50 of from 0.2 to 4 nm). In addition, in comparison to conventional catalyst articles, the catalyst article obtainable by the method described herein may exhibit a more uniformed dispersion of PGM particles throughout the substrate.

When used in an emission treatment system, the catalyst article may exhibit favourable light-off performance, in particular for NO, CO and total hydrocarbons during three-way catalytic conversions for stoichiometric gasoline emissions abatement.

The catalyst is preferably for three-way catalysis.

The catalyst article may have a washcoat loading of from 1 g/in$^3$ to 3 g/in$^3$. Such a catalyst article may exhibit similar or higher catalytic activity in comparison to conventional catalyst articles but may be lower cost in view of the lower levels of PGM employed.

The substrate preferably comprises a wall flow filter substrate or a flow-through substrate.

In a preferred embodiment, the catalyst article comprises a bottom layer of support material having rhodium thereon and a top layer of support material having palladium thereon. In another preferred embodiment, the catalyst article comprises a bottom layer of support material having palladium thereon and a top layer of support material having rhodium thereon. The term "bottom layer" as used herein may encompass a layer (e.g. washcoat layer) that is closest to or in contact with the substrate (i.e. substrate walls). The term "top layer" as used herein may encompass a layer (e.g. a washcoat layer) that is more remote from the substrate (i.e. substrate walls) than the bottom layer, and may be situated on top of the bottom layer.

In such preferred embodiments, the support material preferably comprises alumina and ceria-zirconia.

The catalyst article, in particular in such preferred embodiments, preferably comprises from 2 g/ft$^3$ to 15 g/ft$^3$ rhodium, more preferably from 5 g/ft$^3$ to 10 g/ft$^3$ rhodium. Advantageously, such rhodium levels may be lower than those of conventional catalyst articles but without compromising catalytic activity.

The catalyst article, in particular in such preferred embodiments, preferably comprises from 50 g/ft$^3$ to 200 g/ft$^3$ palladium, more preferably from 80 g/ft$^3$ to 150 g/ft$^3$ palladium. Advantageously, such palladium levels may be lower than those of conventional catalyst articles but without compromising catalytic activity.

In a preferred embodiment, the loaded support material is disposed on the substrate in the form of a slurry, the PGM comprises rhodium, the support material comprises alumina and the slurry further comprises ceria-zirconia. In another preferred embodiment, the loaded support material is disposed on the substrate in the form of a slurry, the PGM comprises rhodium, the support material comprises ceria-zirconia and the slurry further comprises alumina. In another preferred embodiment, the loaded support material is disposed on the substrate in the form of a slurry, the PGM comprises rhodium and the support material comprises alumina and ceria-zirconia.

In a further aspect, the present invention provides an emission treatment system comprising the catalyst article described herein.

The emission treatment system is preferably for a gasoline engine.

The gasoline engine preferably operates under stoichiometric conditions.

In a further aspect, the present invention provides a method of treating an exhaust gas, the method comprising:
- providing the catalyst article described herein; and
- contacting the catalyst article with an exhaust gas.

The exhaust gas is preferably an exhaust gas from a gasoline engine. The catalyst article is particularly suitable for treating such exhaust gas. The gasoline engine preferably operates under stoichiometric conditions.

The invention will now be described in relation to the following non-limiting examples.

A number of catalyst articles were prepared and tested according to the following examples:

Example 1

Two washcoated catalysts with Rh supported on a single alumina support were prepared, by a conventional method and a method according to the invention, respectively.

Reference Catalyst 1 (0.3% Rh/Gamma Alumina (with Rh Nitrate) Washcoated Catalyst)

1. Rh nitrate (5 g/ft$^3$) was added to water and mixed for 1 hr to dissolve.
2. A milled gamma alumina (1 g/in$^3$) slurry was added and mixed for 1 hr.
3. Deionised water was added to adjust solids to ~20%.
4. Activated 4 wt % thickening agent in water was added to adjust batch solid to 30%. This was then mixed vigorously with VWR vortex mixer until a homogeneous gel formed.
5. 1×3 inch cores were coated targeting a 1.2 inch dose from inlet under vacuum pull, then dried with air cure.
6. The brick was then fired at 500° C. for 30 minutes in a static oven.

Catalyst 1 (0.3% Rh/Gamma Alumina (with Rh Modified by Humic Acid) Washcoated Catalyst)

1. Rh nitrate (5 g/ft$^3$) was added to water and mixed for 1 hr to dissolve.
2. Humic acid (HA) was then added targeting a HA:Rh mass ratio of 1.7 and mixed for 1 hr.
3. A milled gamma alumina (1 g/in$^3$) slurry was added and mixed for 1 hr.
4. Deionised water was added to adjust solids to ~20%.
5. Activated 4 wt % thickening agent in water was added to adjust batch solid to 30%. This was then mixed vigorously with VWR vortex mixer until a homogeneous gel formed.
6. 1×3 inch cores were coated targeting a 1.2 inch dose from inlet under vacuum pull, then dried with air cure.
7. The brick was then fired at 500° C. for 30 minutes in a static oven.

Figure 1B:
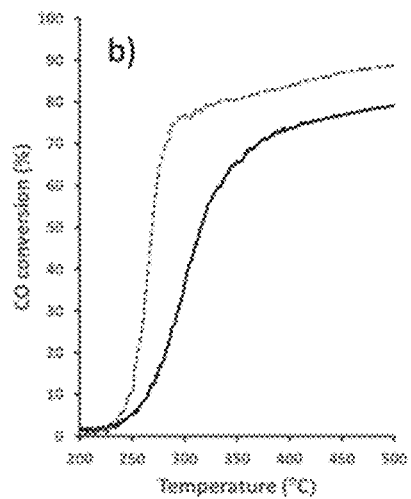
FIG. 1b shows CO conversion results of perturbated light-off performance testing at stoichiometric TWC condition of Reference Catalyst 1 and Catalyst 1.
Figure 1C:
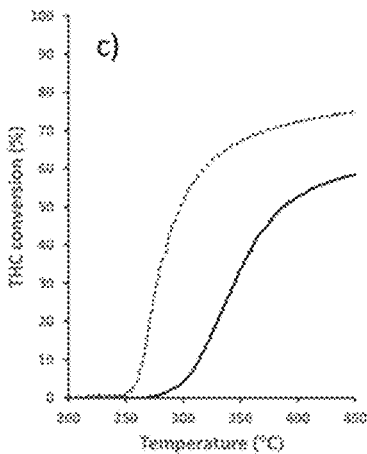
FIG. 1c shows THC conversion results of perturbated light-off performance testing at stoichiometric TWC condition of Reference Catalyst 1 and Catalyst 1.

Each catalyst was then aged under 1000° C./redox/40 h and compared for perturbated light-off performance under simulated gasoline exhaust conditions; with the results shown in FIG. 1 for NO, CO and THC (total hydrocarbons) conversions. The reaction conditions were, with rich pre-treatment, 150-700° C., λ=0.96~1.04, GHSV=200,000 hr$^{-1}$. Compared to Reference Catalyst 1, Catalyst 1 prepared by complexing Rh with humic acid exhibited significant benefit in TWC activity. The maximum T$_{50}$ (the temperature at which the catalyst converts 50% of the inlet concentration of the pollutant in question) reduction for NO, CO, and THC for single alumina-supported Rh catalyst by HA modification were respectively 34° C., 46° C. and 90° C.

Example 2

More complex washcoated catalysts were prepared by a conventional method and the method of the invention, respectively.

Reference Catalyst 2.1 (Rh-TWC (with Rh Nitrate) Washcoated Catalyst)

1. A slurry of milled gamma alumina support (0.6 g/in$^3$) was prepared.
2. Rhodium nitrate solution (Rh loading 5 g/ft$^3$) was added and the slurry was mixed until homogeneous.
3. Ammonium was added dropwise until a pH of 7.0-7.5 was reached. The washcoat thickened upon ammonium addition.
4. The washcoat was mixed for 15-20 minutes so the rhodium became a precipitate throughout the washcoat.
5. Ceria-zirconia support (0.7 g/in$^3$) was added and the slurry was mixed for 30 minutes until homogeneous.
6. Binder material (0.03 g/in$^3$) was added and the slurry was mixed for 30 minutes.
7. Deionised water was added to adjust solids to ~23%.
8. A thickening agent targeting a ~1.0-1.2 wt % water-based washcoat was added. The washcoat was mixed for at least 6 hours.
9. A cordierite substrate was coated with a 1.2 inch single dose washcoat from inlet under vacuum pull, then dried with air cure.
10. The washcoated brick was then fired at 500° C. for 30 minutes in a static oven.

Reference Catalyst 2.2 (Rh-TWC (with Rh Nitrate) Washcoated Catalyst)

Another reference catalyst was manufactured according to the method of Reference Catalyst 2.1, but with a higher Rh loading of 9 g/ft$^3$.

Catalyst 2 (Rh-TWC (with Rh Modified by Humic Acid) Washcoated Catalyst)

1. A slurry of rhodium nitrate (Rh loading 5 g/ft$^3$) was prepared.
2. Humic acid (HA) was then added targeting a HA:Rh mass ratio of 1.68 and mixed for 1 hr.
3. A milled gamma alumina support (0.6 g/in$^3$) was then added to the slurry, which was mixed for 1 hr.
4. Ceria-Zirconia support (0.7 g/in$^3$) was added and the slurry was mixed for 30 minutes until homogeneous.
5. Binder material (0.03 g/in$^3$) was added and the slurry was mixed for 30 minutes.
6. Deionised water was added to adjust solids to ~23%.
7. A thickening agent targeting a ~1.0-1.2 wt % water-based washcoat was added. The washcoat was mixed for at least 6 hours.
8. A cordierite substrate was coated with a 1.2 inch single dose washcoat from inlet under vacuum pull, then dried with air cure.
9. The washcoated brick was then fired at 500° C. for 30 minutes in a static oven.

Figure 2A:
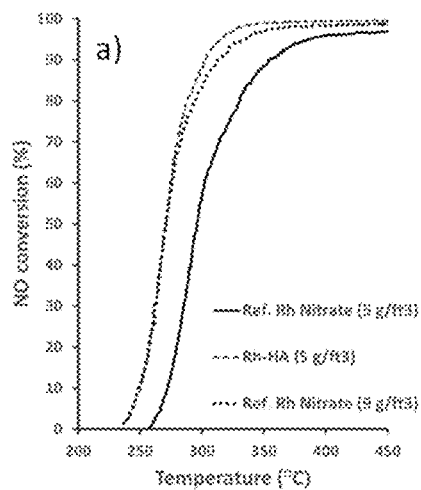
FIG. 2a shows NO conversion results of perturbated light-off performance testing at stoichiometric TWC condition of Reference Catalyst 2.1, Reference Catalyst 2.2 and Catalyst 2.
Figure 2B:
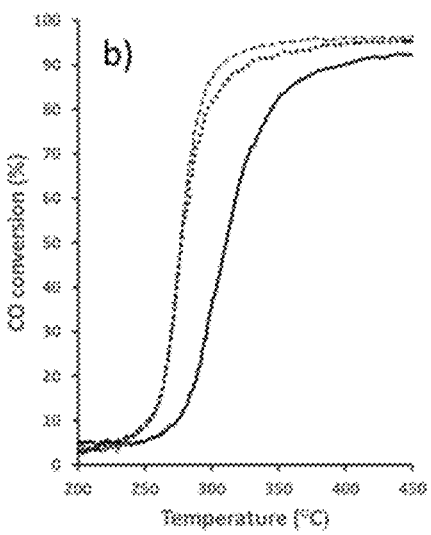
FIG. 2b shows CO conversion results of perturbated light-off performance testing at stoichiometric TWC condition of Reference Catalyst 2.1, Reference Catalyst 2.2 and Catalyst 2.
Figure 2C:
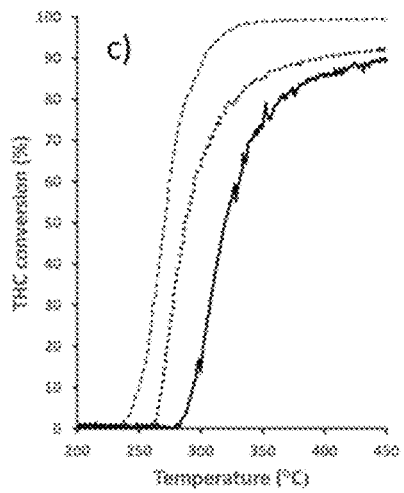
FIG. 2c shows THC conversion results of perturbated light-off performance testing at stoichiometric TWC condition of Reference Catalyst 2.1, Reference Catalyst 2.2 and Catalyst 2.

Each catalyst was then aged under 1000° C./redox/40 h and compared for perturbated light-off performance under simulated gasoline exhaust conditions. The reaction conditions were, with rich pre-treatment, 150-700° C., λ=0.96~1.04, GHSV=200,000 hr$^{-1}$. Similar improvements were observed in the more complex formulated Rh catalysts in EXAMPLE 2, with the results shown in FIG. 2 for NO, CO, and THC conversions. The Rh-HA Catalyst 2 showed significantly better performance than Reference Catalyst 2.1 with the same Rh loading of 5 g/ft$^3$; with maximum T50 reduction for NO, CO, and THC respectively 25° C., 33° C. and 48° C. Moreover, Catalyst 2 also showed similar or better TWC light-off performance than Reference Catalyst 2.2 with 1.8 times higher Rh loading at 9 g/ft$^3$.

Example 3

Bimetallic (Rh—Pt) washcoated catalysts were also prepared by a conventional method and the method of the invention, respectively.

Reference Catalyst 3 (Rh—Pt Bimetallic (with Pt Nitrate) TWC Washcoated Catalyst)

1. A Ceria-Zirconia support (1.1 g/in$^3$) slurry was prepared by adding at least 50% of planned water.
2. Rh nitrate (Rh loading 4 g/ft$^3$) was added to the Ceria-Zirconia slurry, and mixed for at least 15 minutes.
3. The pH was adjusted to >6 with ammonia and the slurry mixed for at least 1 hour.
4. A gamma alumina (0.4 g/in$^3$) slurry was then added followed by platinum nitrate (Pt loading 2 g/ft$^3$). The slurry was mixed for at least 15 minutes.
5. The pH was adjusted to >5.8 with ammonia and the slurry was mixed for at least 30 minutes.
6. A binder (0.03 g/in$^3$) was added and the slurry mixed for at least 30 minutes.
7. The washcoat was adjusted to the target solid % (~25%), and thickening agent was added (~0.8-1.0%). The slurry was mixed overnight.
8. A cordierite substrate was coated with a 1.2 inch single dose washcoat from inlet under vacuum pull, then dried with air cure.
9. The brick was then fired at 500° C. for 30 minutes in a static oven.

Catalyst 3 (Rh—Pt Bimetallic TWC (with Pt Modified by Humic Acid) Washcoated Catalyst)

1. A Ceria-Zirconia support (1.1 g/in$^3$) slurry was prepared by adding at least 50% of planned water.
2. Rh nitrate (Rh loading 4 g/ft$^3$) was added to the Ceria-Zirconia slurry, and mixed for at least 15 minutes.
3. The pH was adjusted to >6 with ammonia and the slurry mixed for at least 1 hour.
4. A gamma alumina (0.4 g/in$^3$) slurry was then added followed by platinum nitrate (Pt loading 2 g/ft$^3$). The slurry was mixed for at least 15 minutes.
5. Humic acid (HA) was then added targeting a HA:Pt mass ratio of 1.4.
6. A binder (0.03 g/in$^3$) was added and the slurry mixed for at least 30 minutes.
7. The washcoat was adjusted to the target solid % (~25%), and thickening agent was added (~0.8-1.0%). The slurry was mixed overnight.
8. A cordierite substrate was coated with a 1.2 inch single dose washcoat from inlet under vacuum pull, then dried with air cure.
9. The brick was then fired at 500° C. for 30 minutes in a static oven.

Figure 3A:
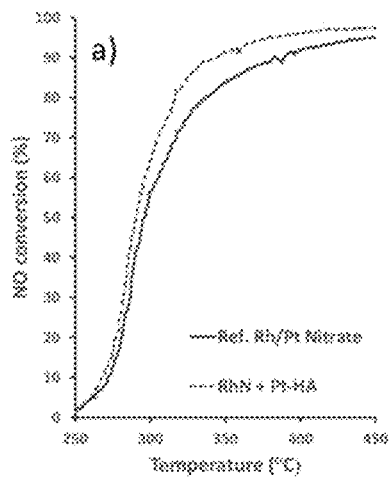
FIG. 3a shows NO conversion results of perturbated light-off performance testing at stoichiometric TWC condition of Reference Catalyst 3 and Catalyst 3.
Figure 3B:
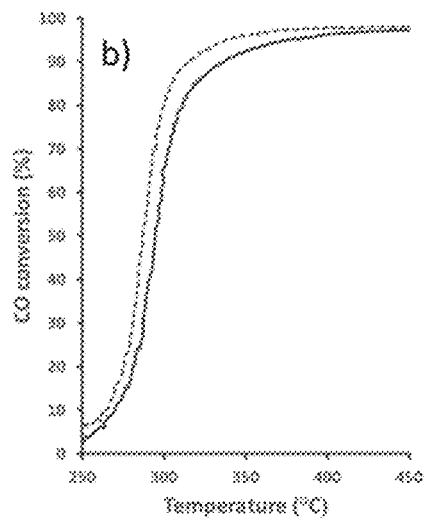
FIG. 3b shows CO conversion results of perturbated light-off performance testing at stoichiometric TWC condition of Reference Catalyst 3 and Catalyst 3.
Figure 3C:
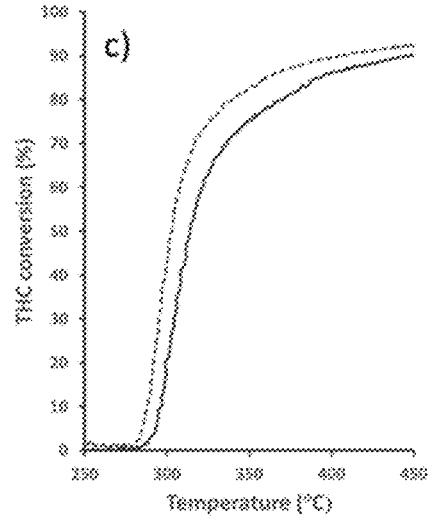
FIG. 3c shows THC conversion results of perturbated light-off performance testing at stoichiometric TWC condition of Reference Catalyst 3 and Catalyst 3.

Each catalyst was then aged under 1050° C./10% H$_2$O in air/4 hr and compared for perturbated light-off performance under simulated gasoline exhaust conditions. The reaction conditions were, with rich pre-treatment, 150-700° C., $\lambda$=0.96~1.04, GHSV=200,000 hr$^{-1}$. Similar improvements were also observed for Catalyst 3 where Pt was modified by HA in comparison with Reference Catalyst 3, with the results shown in FIG. 3 for NO, CO, and THC conversions. Catalyst 3 showed significantly better performance than Reference Catalyst 3, with maximum T$_{90}$ reduction for NO, CO, and THC respectively 34° C., 20° C. and 43° C.

Example 4

Figure 4:
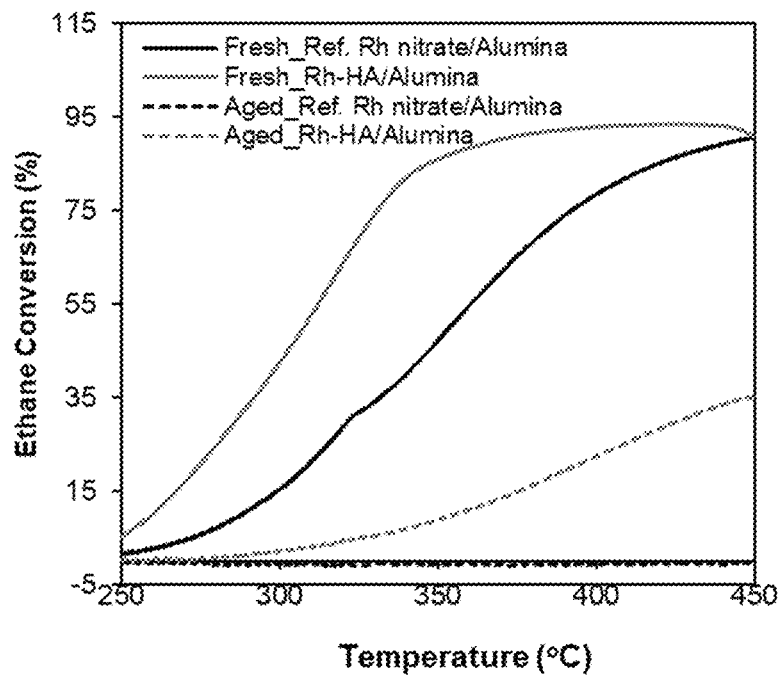
FIG. 4 shows ethane conversion during ethane hydrogenolysis tests over fresh and aged single supported Rh catalysts from EXAMPLE 1.

Ethane conversion during ethane hydrogenolysis tests over fresh and aged single supported Rh catalysts (as manufactured according to EXAMPLE 1). The results are shown in FIG. 4. Aging conditions: 1000° C./Redox/40 hr. Reaction conditions: with degas pre-treatment, 0.5% C$_2$H$_6$ and 2.8% H$_2$ balanced with N$_2$. The result enables qualitative comparison of Rh active metal surface area, with higher ethane conversion indicating higher active Rh dispersion/metal surface area. Compared to Reference Catalyst 1, HA modification (Catalyst 1) led to both higher fresh and aged Rh active metal surface area, and lower fresh-to-aged difference, indicating improved Rh stability towards aging at relevant conditions.

Example 5

Figure 5:
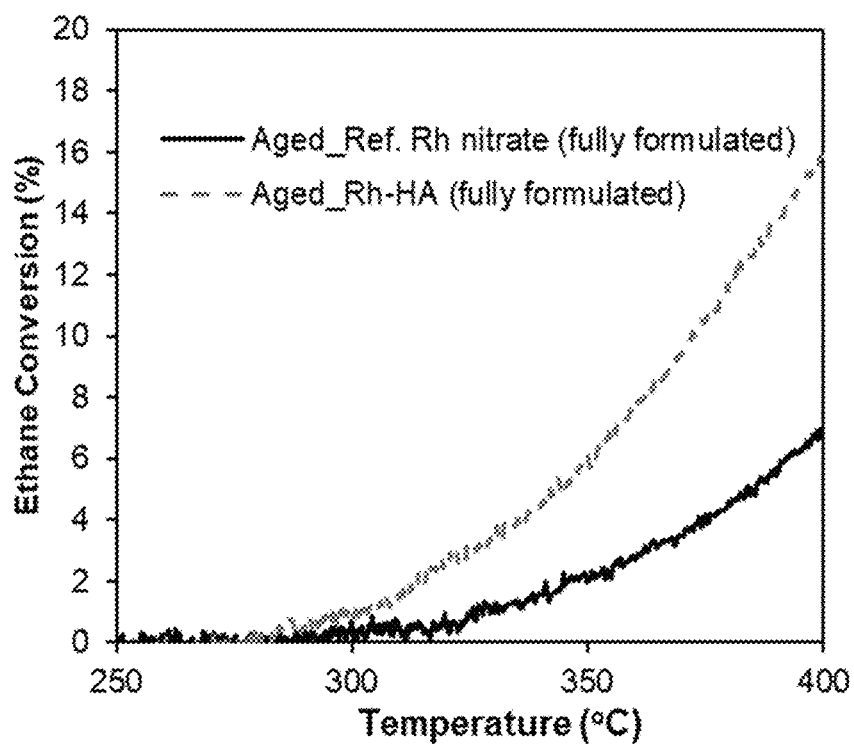
FIG. 5 shows ethane conversion during ethane hydrogenolysis tests over aged fully formulated Rh-TWCs from EXAMPLE 2.

Ethane conversion during ethane hydrogenolysis tests over aged fully-formulated Rh-TWCs, with or without Rh modification by humic acid (as manufactured according to EXAMPLE 2). The results are shown in FIG. 5. Aging conditions: 1000° C./Redox/40 hr. Reaction conditions: with degas pre-treatment, 0.5% C$_2$H$_6$ and 2.8% H$_2$ balanced with N$_2$. The result enables qualitative comparison of Rh active metal surface area, with higher ethane conversion indicating higher active Rh dispersion/metal surface area. Compared to Reference Catalyst 2.1, HA modification (Catalyst 2) led to higher aged Rh active metal surface area, providing more accessible Rh for TWC conversion.

The foregoing detailed description has been provided by way of explanation and illustration, and is not intended to limit the scope of the appended claims. Many variations in the presently preferred embodiments illustrated herein will be apparent to one of ordinary skill in the art and remain within the scope of the appended claims and their equivalents.

The invention claimed is:

1. A method of manufacturing a catalyst article, the method comprising:
   providing a complex of a humic acid or derivative thereof, and a PGM;
   providing a support material;
   applying the complex to the support material to form a loaded support material;
   disposing the loaded support material on a substrate; and
   heating the loaded support material to form nanoparticles of the PGM on the support material.

2. The method of claim 1, wherein the PGM comprises one or more of palladium, rhodium and platinum.

3. The method of claim 2, wherein the PGM comprises rhodium and/or platinum.

4. The method of claim 1, wherein providing a complex of a humic acid or derivative thereof, and a PGM comprises contacting a PGM with a mixture of a humic acid or derivate thereof and fulvic acid.

5. The method of claim 1, wherein providing a complex of a humic acid or derivative thereof, and a PGM comprises contacting a PGM with a substance of one or more of humic acid, potassium humate, and sodium humate.

6. The method of claim 1, wherein the complex has a humic acid to PGM atom mass ratio of from 0.5 to 5.

7. The method of claim 1, wherein the support material comprises an oxide.

8. The method of claim 1, wherein the support material comprises alumina.

9. The method of claim 1, wherein the support material comprises ceria-zirconia.

10. The method of claim 7, wherein the alumina and/or ceria-zirconia is doped.

11. The method of claim 10, wherein the alumina and/or ceria-zirconia is doped with an oxide of one or more of lanthanum, neodymium, yttrium, niobium, praseodymium, hafnium, molybdenum, titanium, vanadium, zinc, cadmium, manganese, iron, copper, calcium, barium, strontium, caesium, magnesium, potassium and sodium.

12. The method of claim 1, wherein the loaded support material is disposed on the substrate in the form of a slurry.

13. The method of claim 12, wherein providing a complex of a humic acid or derivative thereof, and a PGM comprises synthesising the complex in situ in the slurry.

14. The method of claim 12, wherein the slurry is prepared by a method comprising:
   contacting a PGM salt and a humic acid or derivative thereof in water to form the complex of a humic acid or derivative thereof, and a PGM in an aqueous solution;
   applying the complex to the support material to form a loaded support material by contacting the support material with the aqueous solution;
   optionally adding one or more of an oxygen storage material; a promoter salt; a binder; an acid or a base; a thickening agent; and a reducing agent to the aqueous solution.

15. The method of claim 12, wherein the slurry is prepared by a method comprising:
   contacting a PGM salt and a support material in water to form a support material suspension;
   contacting the support material suspension with a humic acid or derivative thereof to form a loaded support material, the loaded support material comprising support material having a complex loaded thereon, the complex comprising a complex of a humic acid or derivative thereof, and the PGM;
   optionally adding one or more of an oxygen storage material; a promoter salt; a binder; an acid or a base; a thickening agent; and a reducing agent to the support material suspension.

16. The method of claim 12, further comprising disposing a further slurry on the substrate, the further slurry comprising one or more of a further support material; an oxygen storage material; a promoter salt; a binder; an acid or a base; a thickening agent; and a reducing agent, wherein disposing the further slurry on the substrate takes place before disposing the support material on the substrate and/or after heating the loaded support material to form nanoparticles of the PGM on the support material.

17. The method of claim 1, wherein the substrate is in the form of a honeycomb monolith, a wall flow filter or a flow through filter.

18. The method of claim 1, wherein the heating is carried out:
   at a temperature of from 400° C. to 700° C.; and/or
   for from 10 to 360 minutes.

19. A catalyst article obtainable by the method of claim 1, the catalyst article for use in an emission treatment system.

20. The catalyst article of claim 1 comprises a bottom layer of support material having rhodium thereon and a top layer of support material having palladium thereon.

21. The catalyst article of claim 1 comprising a bottom layer of support material having palladium thereon and a top layer of support material having rhodium thereon.

* * * * *